United States Patent [19]

Wissbrun et al.

[11] 4,325,903

[45] Apr. 20, 1982

[54] PROCESSING OF MELT PROCESSIBLE LIQUID CRYSTAL POLYMER BY CONTROL OF THERMAL HISTORY

[75] Inventors: Kurt F. Wissbrun, Short Hills; Yoshiaki Ide, North Plainfield, both of N.J.

[73] Assignee: Celanese Corporation, New York, N.Y.

[21] Appl. No.: 169,012

[22] Filed: Jul. 15, 1980

[51] Int. Cl.³ .................................................. B28B 3/20
[52] U.S. Cl. .............................. 264/176 R; 264/176 F; 528/176; 528/272; 528/310
[58] Field of Search ..................... 264/176 B, 176 R; 528/176, 272, 310

[56] References Cited

U.S. PATENT DOCUMENTS

| | | | |
|---|---|---|---|
| 4,054,633 | 10/1977 | Richardson | 264/184 |
| 4,184,996 | 1/1980 | Calundann | 260/40 P |
| 4,267,289 | 5/1981 | Froix | 264/176 R |

*Primary Examiner*—Jay H. Woo
*Attorney, Agent, or Firm*—Charles B. Barris

[57] ABSTRACT

A process for the extrusion of melt processable liquid crystal polymer which provides improved processability characteristics is provided. The process comprises the steps of subjecting the liquid crystal polymer to an elevated temperature between the DSC transition temperature and the degradation temperature of the polymer; cooling the liquid crystal polymer to a processing temperature which is between the DSC transition temperature and the elevated temperature and at which the liquid crystal polymer is less subject to degradation than at the elevated temperature; and extruding the liquid crystal polymer into the form of a shaped article having mechanical properties which are improved over those of articles formed from liquid crystal polymer which has not been subjected to the elevated temperature. Preferably, the liquid crystal polymer exhibits at the elevated temperature a reduction by at least a factor of 5 in the melt viscosity of the liquid crystal polymer, as compared to the melt viscosity at the DSC transition temperature, without significant degradation of the liquid crystal polymer. The reduction in melt viscosity is substantially retained by the liquid crystal polymer at the processing temperature, and the liquid crystal polymer is extruded into the form of a shaped article while the reduction in melt viscosity is thus retained. By employing the process of the present invention, melt processable liquid crystal polymers can be conveniently processed at temperatures near the DSC transition temperature rather than at the higher temperatures commonly encountered in the prior art at which degradation is more likely to occur.

53 Claims, No Drawings

PROCESSING OF MELT PROCESSIBLE LIQUID CRYSTAL POLYMER BY CONTROL OF THERMAL HISTORY

BACKGROUND OF THE INVENTION

The present invention relates to a process for the extrusion of melt processable liquid crystal polymer. The process provides for improved processability of the liquid crystal polymer and yields shaped articles having improved properties.

Melt processable liquid crystal polymers are well-known in the art. These polymers commonly exhibit very high melting temperatures and hence must be processed at inconveniently high temperatures. Moreover, prolonged exposure to high temperatures commonly causes degradation of the polymer and results in the production of shaped articles having relatively poor properties.

It has now been found that melt processable liquid crystal polymers can be processed at decreased temperatures by controlling the thermal history of the polymer. Specifically, it has been found that shaped articles having improved mechanical properties can be formed from liquid crystal polymer which has been subjected to an elevated temperature between the DSC transition temperature and the degradation temperature of the polymer, cooling the liquid crystal polymer to a processing temperature which is between the DSC transition temperature and the elevated temperature, and extruding the liquid crystal polymer into the form of a shaped article. Preferably, a substantial decrease in melt viscosity occurs when the liquid crystal polymer is subjected to the elevated temperature and, upon cooling, the liquid crystal polymer substantially retains the lower melt viscosity exhibited by the liquid crystal polymer at the elevated temperature. The reduction in melt viscosity is retained for a period of time sufficient to allow melt processing of the liquid crystal polymer at lower temperatures. As a result, the liquid crystal polymer may be processed at a lower temperature between the DSC transition temperature and the elevated temperature, the combination of the relatively low processing temperature and the reduction in melt viscosity providing an improvement in processability of the liquid crystal polymer.

The process of the present invention is especially applicable to liquid crystal polymers having relatively high DSC transition temperatures. By employing the process of the present invention, such polymers can be conveniently processed at temperatures near the DSC transition temperature rather than at the higher temperatures commonly encountered in the prior art at which degradation is more likely to occur. This improved processability is believed to be due to the liquid crystal polymer substantially retaining, upon being cooled to the processing temperature, a reduction in melt viscosity which may be achieved by subjecting the liquid crystal polymer to the elevated temperature. The liquid crystal polymer melt can therefore be extruded at a lower, more convenient processing temperature while the melt retains a reduction in melt viscosity which has heretofore been thought to be available only at increased temperatures. Hence, the process of the present invention provides for the melt processing of liquid crystal polymer while taking advantage of a combination of relatively low processing temperature and a reduction in melt viscosity. Moreover, the shaped articles produced according to the present invention exhibit improved mechanical properties as a result of the improved processing conditions employed herein.

Therefore, it is an object of the present invention to provide an improved process for the extrusion of melt processable liquid crystal polymer.

It is also an object of the present invention to provide a process for the extrusion of melt processable liquid crystal polymer which provides improved processability characteristics and which yields shaped articles having improved properties.

It is also an object of the present invention to provide a process for the extrusion of melt processable liquid crystal polymer, wherein the thermal history of the liquid crystal polymer is controlled, thereby providing improved processability characteristics and yielding shaped articles having improved properties.

It is also an object of the present invention to provide a process for the extrusion of melt processable liquid crystal polymer which provides improved processability characteristics and which yields shaped articles having improved properties, wherein the liquid crystal polymer can be conveniently processed at a relatively low temperature at which polymer degradation is minimized due to control of the thermal history of the polymer.

It is also an object of the present invention to provide a process for the extrusion of melt processable liquid crystal polymer which provides improved processability characteristics and which yields shaped articles having improved properties, wherein the liquid crystal polymer can be conveniently processed at a relatively low processing temperature due to a significant reduction in the melt viscosity of the polymer which is "remembered" by the polymer at the lower temperature and which is achieved by controlling the thermal history of the polymer.

These and other objects as well as the scope, nature, and utilization of the present invention will be apparent from the following description and appended claims.

SUMMARY OF THE INVENTION

The present invention provides a process for the extrusion of melt processable liquid crystal polymer which provides improved processability characteristics and which yields shaped articles having improved properties. The process comprises the steps of:

(a) subjecting the liquid crystal polymer to an elevated temperature between the DSC transition temperature and the degradation temperature of the polymer;

(b) cooling the liquid crystal polymer to a processing temperature which is between the DSC transition temperature and the elevated temperature and at which the liquid crystal polymer is less subject to degradation than at the elevated temperature; and (c) extruding the liquid crystal polymer into the form of a shaped article having mechanical properties which are improved over those of articles formed from liquid crystal polymer which has not been subjected to the elevated temperature.

Preferably, the process comprises the steps of:

(a) subjecting the liquid crystal polymer to an elevated temperature between the DSC transition temperature and the degradation temperature of the polymer for a period of time, wherein the elevated temperature and the period of time are sufficient to effect a reduction by at least a factor of 5 in the melt viscosity of the liquid crystal polymer, as compared to the melt viscosity at the DSC transition temperature, without significant degradation of the liquid crystal polymer;

(b) cooling the liquid crystal polymer to a processing temperature which is between the DSC transition temperature and the elevated temperature and at which the liquid crystal polymer substantially retains the lower melt viscosity exhibited by the liquid crystal polymer at the elevated temperature and at which the liquid crystal polymer is less subject to degradation, the melt viscosity of the liquid crystal polymer at the processing temperature after exposure to the elevated temperature being substantially less than the melt viscosity of the liquid crystal polymer at the processing temperature without having been exposed to the elevated temperature; and (c) extruding the liquid crystal polymer into the form of a shaped article while the melt of the liquid crystal polymer substantially retains the melt viscosity exhibited by the liquid crystal polymer at the elevated temperature.

DETAILED DESCRIPTION OF THE INVENTION

The present invention provides a process for the extrusion of melt processable liquid crystal polymers which are capable of forming an anisotropic melt phase. Melt processable liquid crystal polymers include certain aromatic-aliphatic polyesters, aromatic polyazomethines, aromatic polyester-carbonates, polyimide-esters, and wholly aromatic polyesters. The aromatic polyesters are considered to be "wholly" aromatic in the sense that each moiety present in the polyester contributes at least one aromatic ring to the polymer backbone.

The above-described polymers, in order to be useful in the process of the present invention, must exhibit optical anisotropy in the melt phase. These polymers readily form liquid crystals in the melt phase. Such anisotropic properties are manifested at a temperature at which the liquid crystal polymer readily undergoes melt processing to form shaped articles. The anisotropic properties may be confirmed by conventional polarized light techniques whereby crossed-polarizers are utilized. More specifically, the anisotropic melt phase may conveniently be confirmed by the use of a Leitz polarizing miscroscope at a magnification of 40X with the sample on a Koffler hot stage and under a nitrogen atmosphere. The melt phases of the liquid crystal polymers which are suitable for use in the process of the present invention are optically anisotropic, i.e., they transmit light when examined between crossed-polarizers. By contrast, the melt of a conventional isotropic polymer will not transmit appreciable light when placed between crossed-polarizers.

The liquid crystal polymers which are suitable for use in the process of the present invention exhibit a wide range of inherent viscosities, depending upon the particular liquid crystal polymer used. The liquid crystal polymers commonly exhibit an inherent viscosity of at least 0.5 dl./g., e.g., within the range of approximately 0.5 to 10.0 dl./g.

Specific examples of suitable aromatic-aliphatic polyesters are copolymers of polyethylene terephthalate and hydroxybenzoic acid as disclosed in *Polyester X7G-A Self Reinforced Thermoplastic*, by W. J. Jackson, Jr., H. F. Kuhfuss, and T. F. Gray, Jr., 30th Anniversary Technical Conference, 1975 Reinforced Plastics/Composites Institute, The Society of the Plastics Industry, Inc., Section 17-D, Pages 1-4. A further disclosure of such copolymer can be found in "Liquid Crystal Polymers: I. Preparation and Properties of p-Hydroxybenzoic Acid Copolymers," *Journal of Polymer Science, Polymer Chemistry Edition*, Vol. 14, pp. 2043-58 (1976), by W. J. Jackson, Jr. and H. F. Kuhfuss. The above-cited references are herein incorporated by reference in their entirety.

Aromatic polyazomethines and processes of preparing the same are disclosed in U.S. Pat. Nos. 3,493,522; 3,493,524; 3,503,739; 3,516,970; 3,516,971; 3,526,611; 4,048,148; and 4,122,070. Each of these patents is herein incorporated by reference in its entirety. Specific examples of such polymers include poly(nitrilo-2-methyl-1,4-phenylenenitriloethylidyne-1,4-phenyleneethylidyne); poly(nitrilo-2-methyl-1,4-phenylenenitrilomethylidyne-1,4-phenylenemethylidyne); and poly(nitrilo-2-chloro-1,4-phenylenenitrilomethylidyne-1,4-phenylenemethylidyne).

Aromatic polyester-carbonates are disclosed in U.S. Pat. No. 4,107,143, which is herein incorporated by reference in its entirety. Examples of such polymers include those consisting essentially of hydroxybenzoic acid units, hydroquinone units, carbonate units, and, depending on the circumstances, aromatic carboxylic acid units.

Polyimide-esters are disclosed in U.S. Pat. No. 4,176,223, which is herein incorporated by reference. Examples of such polymers include those derived from 2,6-naphthalene dicarboxylic acid and either a substituted diphenol and 4-(4'-carboxyphthalimido)benzoic acid or terephthalic acid and 4-(4'-hydroxyphthalimido)phenol.

The liquid crystal polymers which are preferred for use in the process of the present invention are the melt processable wholly aromatic polyesters which are capable of forming an anisotropic melt phase. Recent publications disclosing such polyesters include (a) Belgian Pat. Nos. 828,935 and 828,936, (b) Dutch Pat. No. 7505551, (c) West German Pat. Nos. 2520819, 2520820, and 2,722,120, (d) Japanese Pat. Nos. 43-223, 2132-116, 3017-692, and 3021-293, (e) U.S. Pat. Nos. 3,991,013; 3,991,014; 4,057,597; 4,066,620; 4,075,262; 4,118,372; 4,156,070; 4,159,365; 4,169,933; and 4,181,792; and (f) U.K. Application No. 2,002,404.

Wholly aromatic polyesters which are prepared for use in the process of the present invention are disclosed in commonly-assigned U.S. Pat. Nos. 4,067,852; 4,083,829; 4,130,545; 4,161,470; and 4,184,996; and in commonly-assigned U.S. application Ser. Nos. 10,392, filed Feb. 8, 1979 (now U.S. Pat. No. 4,238,599) 10,393, filed Feb. 8, 1979 (now U.S. Pat. No. 4,238,598); 17,007, filed Mar. 2, 1979 (now U.S. Pat. No. 4,230,817); 21,050, filed Mar. 16, 1979 (now U.S. Pat. No. 4,224,433); 32,086, filed Apr. 23, 1979 (now U.S. Pat. No. 4,219,461); and 54,049, filed July 2, 1979 (now U.S. Pat. No. 4,256,624). The disclosures of all of the above-identified commonly-assigned U.S. patents and applications are herein incorporated by reference in their entirety.

The wholly aromatic polyesters which are suitable for use in the process of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc. The organic monomer compounds may be reacted in the absence of a heat exchange fluid via a melt acidolysis procedure when acyloxyacids are used or when ower acyl esters of aromatic diols are used with aromatic diacids. They, accordingly, may be heated initially to form a melt solution of the reactants with the reaction continuing as solid polymer particles are suspended therein. A vacuum may be applied to facilitate removal of volatiles formed during the final stage of the condensation (e.g., acetic acid or water).

In commonly-assigned U.S. Pat. No. 4,083,829, entitled "Melt Processable Thermotropic Wholly Aromatic Polyester," is described a slurry polymerization process which may be employed to form the wholly aromatic polyesters which are suitable for use in the process of the present invention. According to such a process, the solid product is suspended in a heat exchange medium. The disclosure of this patent has previously been incorporated herein by reference in its entirety.

Direct esterification may also be used. For example, hydroxyacids or aryl diols and diacids may be reacted, often in the presence of a catalyst, with the evolution of $H_2O$.

When employing any of the above procedures, the organic monomer reactants from which the wholly aromatic polyesters are derived may be initially provided in a modified form whereby the usual hydroxy groups of such monomers are esterified (i.e., they are provided as lower acyl esters). The lower acyl groups preferably have from about two to about four carbon atoms. Preferably, the acetate esters of organic monomer reactants are provided.

Representative catalysts which optionally may be employed in the above procedures include dialkyl tin oxide (e.g., dibutyl tin oxide), diaryl tin oxide, titanium dioxide, antimony trioxide, alkoxy titanium silicates, titanium alkoxides, alkali and alkaline earth metal salts of carboxylic acids (e.g., zinc acetate), the gaseous acid catalysts, such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The wholly aromatic polyesters suitable for use in the process of the present invention tend to be substantially insoluble in common polyester solvents and accordingly are not susceptible to solution processing. As discussed previously, they can be processed by common melt processing techniques. Most suitable wholly aromatic polyesters are soluble in pentafluorophenol.

The wholly aromatic polyesters which are suitable for use in the process of the present invention commonly exhibit a weight average molecular weight of about 2,000 to 200,000, and preferably about 10,000 to 50,000, e.g., about 20,000 to 25,000. Such molecular weight may be determined by standard techniques not involving the solutioning of the polymer, e.g., by end group determination via infrared spectroscopy on compression molded films. Alternatively, light scattering techniques in a pentafluorophenol solution may be employed to determine the molecular weight.

The wholly aromatic polyesters additionally commonly exhibit an inherent viscosity (i.e., I.V.) of at least approximately 2.0 dl./g. when dissolved in a concentration of 0.1 percent by weight in pentafluorophenol at 60° C.

The liquid crystalline, wholly aromatic polyesters appear to have excellent electrical properties when used as films or coatings in electrical applications. They have high temperature resistance and high dielectric strength, i.e., they are capable of withstanding high voltages without exhibiting substantial breakdown.

The wholly aromatic polyesters above are useful as molding resins and may also be used in the formation of coatings, fibers, and films. They may be molded by injection molding and can be processed by any suitable melt extrusion technique.

Especially preferred wholly aromatic polyesters are those which are disclosed in U.S. Pat. Nos. 4,161,470 and 4,184,996.

The polyester disclosed in U.S. Pat. No. 4,161,470 is a melt processable wholly aromatic polyester which is capable of forming an anisotropic melt phase at a temperature below approximately 350° C. The polyester consists essentially of the recurring moieties I and II wherein:

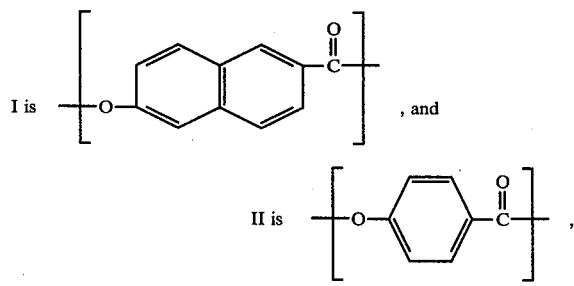

wherein said polyester comprises approximately 10 to 90 mole percent of moiety I, and approximately 10 to 90 mole percent of moiety II. In one embodiment, moiety II is present in a concentration of approximately 65 to 85 mole percent, and preferably in a concentration of approximately 70 to 80 mole percent, e.g., approximately 75 mole percent. In another embodiment, moiety II is present in a lesser proportion of approximately 15 to 35 mole percent, and preferably in a concentration of approximately 20 to 30 mole percent.

The polyester disclosed in U.S. Pat. No. 4,184,996 is a melt processable wholly aromatic polyester which is capable of forming an anisotropic melt phase at a temperature below approximately 325° C. The polyester consists essentially of the recurring moieties I, II, and III wherein:

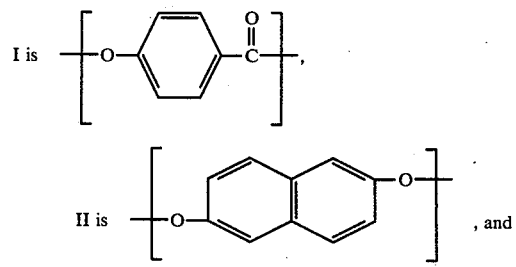

III is 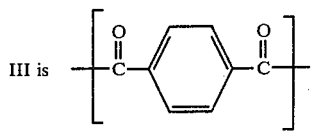

The polyester comprises approximately 30 to 70 mole percent of moiety I. The polyester preferably comprises approximately 40 to 60 mole percent of moiety I, approximately 20 to 30 mole percent of moiety II, and approximately 20 to 30 mole percent of moiety III.

According to the process of the present invention, a liquid crystal polymer is subjected to an elevated temperature. The elevated temperature lies between the DSC transition temperature and the degradation temperature of the polymer.

The DSC transition temperature of melt processable liquid crystal polymers corresponds to the "melting temperature" of the conventional isotropic polymers and can be measured by differential scanning calorimetry (DSC) according to methods well-known in the art. Most of the melt processable liquid crystal polymers which are suitable for use in the process of the present invention "melt" over a range of temperatures which may be broader for some polymers than for others. For the purposes of the present invention, the DSC transition temperature is taken to be the temperature corresponding to the peak of the endotherm curve produced by a differential scanning calorimetry measurement.

The degradation temperature of a polymer can be easily determined by one of ordinary skill in the art. The degradation temperature is evidenced by its effect on the properties of articles formed from the polymer; that is, an article formed from a polymer which has been subjected to a temperature above its degradation temperature exhibits reduced properties. The degradation temperature of a particular polymer can be determined by one of ordinary skill in the art by such tests as thermogravimetric analysis (TGA), wherein a polymer is subjected to a constant heating rate (e.g., 15° C./min.) and the resulting weight loss of the polymers is measured. The liquid crystal polymers suitable for use in the process of the present invention commonly exhibit a degradation temperature, as measured by TGA, within the range of 350° C. to 450° C., e.g., approximately 400° C. Because thermogravimetric analysis is not an isothermal measurement, the degradation temperatures determined by TGA are commonly higher than those observed during melt processing where the polymer is maintained at a relatively high temperature for an extended period of time. Thus, degradation of melt processable liquid crystal polymers during processing is commonly observed at temperatures within the range of approximately 320° C. to 360° C., e.g., approximately 340° C. However, the term "degradation temperature" as used herein refers to the degradation temperatures as determined by TGA.

The elevated temperature utilized in the process of the present invention is preferably within the range of approximately 40° C. to 100° C. (e.g., approximately 60° C. to 85° C.) above the DSC transition temperature of the liquid crystal polymer. In a preferred embodiment, the elevated temperature is approximately 85° C. above the DSC transition temperature of the liquid crystal polymer.

Subjecting the liquid crystal polymer to the elevated temperature commonly effects a significant reduction in the melt viscosity of the liquid crystal polymer. Preferably, this reduction is a reduction by at least a factor of 5 in the melt viscosity of the liquid crystal polymer as compared to the melt viscosity at the DSC transition temperature. More preferably, the reduction in melt viscosity is a reduction by at least a factor of 10, still more preferably, by at least a factor of 100, and it is especially preferred that the melt viscosity of the liquid crystal polymer be reduced by at least a factor of 1,000 as compared to the melt viscosity at the DSC transition temperature.

The period of time for which the liquid crystal polymer is subjected to the elevated temperature is preferably one which is sufficient, at the elevated temperature, to effect a significant reduction in the melt viscosity of the liquid crystal polymer, as compared to the melt viscosity at the DSC transition temperature and at conventional processing temperatures, without significant degradation of the liquid crystal polymer. This period of time is preferably less than approximately 5 minutes, and is more preferably approximately 0.5 to 60 seconds (e.g., approximately 30 seconds). By subjecting the liquid crystal polymer to an elevated temperature less than the degradation temperature of a polymer for a period of time sufficient only to achieve a substantial reduction in the melt viscosity of the liquid crystal polymer, significant degradation of the liquid crystal polymer is avoided.

Subsequent to subjecting the liquid crystal polymer to the elevated temperature, the liquid crystal polymer is rapidly cooled to a processing temperature at which the liquid crystal polymer is less subject to degradation than at the elevated temperature. At the processing temperature, the liquid crystal polymer preferably exhibits a substantial retention of the melt viscosity exhibited by the polymer at the elevated temperature, the combination of the relatively low processing temperature and the reduction in melt viscosity giving rise to an improvement in processability of the liquid crystal polymer. The processing temperature is between the DSC transition temperature and the elevated temperature. The processing temperature is preferably within the range of approximately 5° C. to 40° C. above the DSC transition temperature of the liquid crystal polymer, with the proviso that the processing temperature is at least approximately 15° C. less than the elevated temperature.

Following the cooling of the liquid crystal polymer to the processing temperature, the liquid crystal polymer is extruded into the form of a shaped article. The article thus formed exhibits mechanical properties which are improved over those of articles formed from liquid crystal polymer which has not been subjected to the elevated temperature. Preferably, the liquid crystal polymer is extruded while the melt of the liquid crystal polymer substantially retains the melt viscosity exhibited by the polymer at the elevated temperature. The liquid crystal polymer substantially retains the reduction in melt viscosity for an extended period of time on the order of 10 to 30 minutes, e.g., approximately 20 minutes.

The melt of an ordinary, isotropic polymer does not exhibit such behavior. For example, a sample of Dow Styron 666 polystyrene at a temperature of 170° C. was subjected to a temperature of 200° C. for 1 minute and then cooled down again to 170° C. Within 4 minutes of returning to the lower temperature, the melt viscosity of the polystyrene had returned to its initial value.

The process of the present invention is especially applicable to liquid crystal polymers having relatively high DSC transition temperatures. By employing the process of the present invention, such polymers can be conveniently processed at temperatures near the DSC transition temperature rather than at the higher temperatures commonly encountered in the prior art at which degradation is more likely to occur. Thus, the process of the present invention is especially useful with such liquid crystal polymers as wholly aromatic polyesters having DSC transition temperatures of at least approximately 275° C., e.g., approximately 300° C. to 350° C.

The process of the present invention is also especially applicable to liquid crystal polymers which have been subjected to a solid state polymerization. Solid state polymerization commonly increases the DSC transition temperature and the inherent viscosity of the liquid crystal polymers, thereby increasing the difficulty of melt processing the same. In a preferred embodiment, the process of the present invention improves the processability of solid state polymerized liquid crystal polymers by allowing them to be processed under a combination of relatively low processing temperature and reduced melt viscosity. Solid state polymerization is commonly achieved by subjecting liquid crystal polymer to a temperature within the range of approximately 10° C. to 30° C. below the DSC transition temperature of the polymer for a period of time of approximately 10 to 20 hours under an inert atmosphere, e.g., nitrogen.

The advantages of the present invention are believed to be due to the liquid crystal polymer substantially retaining, upon being cooled to the processing temperature, a reduction in melt viscosity which may be achieved by subjecting the liquid crystal polymer to the elevated temperature. It has been observed that the melt viscosity of the liquid crystal polymer slowly increases until it returns to the usual melt viscosity exhibited by the liquid crystal polymer at the lower processing temperature. Thus, there is a time lag between the reduction of temperature of the liquid crystal polymer melt to the processing temperature and the increase in melt viscosity. The liquid crystal polymer melt can therefore be extruded at a lower, more convenient processing temperature while the melt retains a reduction in melt viscosity which has heretofore been thought to be available only at increased temperatures. Hence, the process of the present invention provides for the melt processing of the liquid crystal polymer while taking advantage of a combination of relatively low processing temperature and a reduction in melt viscosity. Moreover, the shaped articles produced according to the present invention exhibit improved mechanical properties.

Theoretical considerations which underlie the process of the present invention are not well understood and are incapable of simple explanation. However, it is believed that the liquid crystal polymers exist as a three-dimensional network in the melt. The crosslinks of the network are perhaps small domains of high melting crystallites, e.g., crystallites of hydroxybenzoate blocks. The dramatic reduction in melt viscosity of the liquid crystal polymer which may occur upon subjecting the liquid crystal polymer to an elevated temperature may be explained as being the result of the melting of the crystallites. The subsequent slow increase in melt viscosity upon return to a lower temperature is believed to be caused by the slow recrystallization of the crystallites. Since it appears that the destruction of the hypothesized crystallite crosslinks by heating is rapid and that their reformation upon cooling is slow, the liquid crystal polymers can be subjected to an elevated temperature for a relatively brief period of time sufficient to melt the crosslinks before any appreciable degradation can occur. The liquid crystal polymer can then be cooled to a processing temperature which is between the DSC transition temperature and the elevated temperature and at which the liquid crystal polymer substantially retains the melt viscosity exhibited by the polymer at the elevated temperature, the combination of the relatively low processing temperature and the reduction in melt viscosity giving rise to an improvement in processability of the liquid crystal polymer. The liquid crystal polymer can then be extruded into the form of a shaped article while the melt of the liquid crystal polymer substantially retains the reduction in melt viscosity.

The liquid crystal polymer can be extruded to form a variety of shaped articles. For example, the liquid crystal polymer can be extruded through a die to form a film or through a spinneret to form a plurality of filaments. The liquid crystal polymer can also be extrusion molded and injection molded to form molded articles.

The extrusion apparatus used in conjunction with the process of the present invention is not critical to the operation of the inventive process and may be any conventional extrusion apparatus. One such apparatus which is suitable for use with the process of the present invention employs a contact melting method so that melt residence time can be kept short and constant. The apparatus includes a heated surface against which a molded rod of liquid crystal polymer is pressed, thereby melting the polymer and subjecting it to the elevated temperature. The fluid stream of molten polymer is then introduced to the extrusion chamber inside of which are disposed a filter pack and an elongational grid (as disclosed in the U.S. Application of Yoshiaki Ide cited below). The polymer melt is extruded through an appropriate extrusion orifice (e.g., slit die, spinneret, etc.) which is maintained at the lower, more convenient processing temperature. Examples of other extrusion apparatus are found, for example, in *Plastics Engineering Handbook of the Society of the Plastics Industry, Inc.,* Fourth Edition, edited by Joel Frados, Van Nostrand Reinhold Company (1976), pp. 156–203.

The process of the present invention is preferably conducted in conjunction with a process invented by Yoshiaki Ide and disclosed in commonly assigned U.S. application Ser. No. 169,013, filed July 15, 1980, entitled "Improved Process for Extruding Liquid Crystal Polymer." The abovecited application is herein incorporated by reference in its entirety. Briefly, the process disclosed therein involves subjecting the flow of liquid crystal polymer to a substantially elongational flow in the substantial absence of shear flow prior to extrusion through an extrusion orifice. It has been observed that subjecting the liquid crystal polymer to elongational flow aids in orienting the liquid crystal polymer molecules in the shaped articles produced by the process.

The following Examples are given as specific illustrations of the invention. It should be understood, however, that the invention is not limited to the specific details set forth in the Examples.

EXAMPLE 1

Measurements were made of the complex viscosity ($\eta^*$) of a liquid crystal polymer which had been subjected to thermal history control in accordance with the process of the present invention. The liquid crystal polymer comprised 25 mole percent by weight of 6-oxy-2-naphthoyl units and 75 mole percent of p-oxybenzoyl units. The polymer exhibited a DSC transition temperature of 288° C. and an inherent viscosity of 8.24 dl./g. when dissolved in a concentration of 0.1 percent by weight in pentafluorophenol at 60° C. The polymer exhibited degradation above 400° C. when tested by TGA.

The complex viscosity was measured in accordance with standard dynamic measurements whereby the polymer sample is placed between two plates and the bottom plate is oscillated at various frequencies ($\omega$).

The complex viscosity of the liquid crystal polymer was measured at a temperature of 310° C. The results are shown in Table I.

TABLE I

| $\omega$ (second$^{-1}$) | $\eta^*$ (poise) |
|---|---|
| 0.1 | $4.4 \times 10^6$ |
| 10.0 | $1.35 \times 10^5$ |

A sample of the liquid crystal polymer which was initially at a temperature of 310° C. was heated to an elevated temperature of 400° C. over a period of 5 minutes. Th polymer was held at the elevated temperature for 1 minute and was then cooled to 310° C. over a period of 5 minutes. The complex viscosity of the polymer was then measured at 310° C. The results are shown in Table II.

TABLE II

| $\omega$ (second$^{-1}$) | $\eta^*$ (poise) |
|---|---|
| 0.1 | $2 \times 10^5$ |
| 10.0 | $1.35 \times 10^4$ |

A comparison of the data in Tables I and II demonstrates that subjecting the liquid crystal polymer to an elevated temperature for a brief period of time provides a reduction in the complex viscosity at the lower temperature. In the present Example, a 20-fold reduction is seen at $\omega = 0.1$ second$^{-1}$, and a 10-fold reduction is seen at $\omega = 10$ second$^{-1}$.

In contrast to ordinary, isotropic polymers which return almost instantaneously to the initial viscosity value at the lower temperature, the liquid crystal polymers retain the reduction in melt viscosity for a substantial period of time. Thus, a period of time of approximately 30 minutes is required for the liquid crystal polymer of the present Example to again exhibit the initial complex viscosity after having been subjected to the elevated temperature.

The present Example demonstrates that, after being cooled to a lower temperature, the liquid crystal polymer substantially retains the reduction in melt viscosity which is achieved by subjecting the liquid crystal polymer to the elevated temperature. The liquid crystal polymer melt can therefore be extruded at a lower, more convenient processing temperature while the melt retains a reduction in melt viscosity which has heretofore been thought to be available only at increased temperatures. Hence, the process of the present invention provides for the melt processing of the liquid crystal polymer while taking advantage of a combination of relatively low processing temperature and a reduction in melt viscosity.

EXAMPLE 2

Filaments were spun from the liquid crystal polymer of Example 1 according to the process of the present invention. Degradation of the polymer during processing was observed at temperatures above approximately 340° C.

A molded rod of the liquid crystal polymer was pressed against a heated metal plate, thereby subjecting the liquid crystal polymer to various elevated temperatures between its DSC transition temperature and its degradation temperature as set forth in Table III below. In each of the described runs, the liquid crystal polymer was subjected to the elevated temperature for approximately 36 seconds. The molten liquid crystal polymer was then introduced into a conventional extrusion apparatus. The extrusion apparatus was provided with an elongational grid, as disclosed by Yoshiaki Ide in "Improved Process for Extruding Liquid Crystal Polymer", U.S. application Ser. No. 169,013, filed July 15, 1980, and with a spinneret. Before being extruded through the single-hole spinneret, the liquid crystal polymer in each run was cooled to a processing temperature of 315° C. The residence time of the polymer in the extrusion apparatus was approximately 6 minutes.

The liquid crystal polymer was extruded through the single-hole spinneret into a filament. The mechanical properties of the filaments for each of these runs were measured and are listed in Table III. For purposes of comparison, the mechanical properties of filaments produced from liquid crystal polymer which was not subjected to an elevated temperature are also given in Table III. The physical properties listed in Table III were measured according to standard ASTM testing procedure D3822.

TABLE III

| Elevated Temperature (°C.) | Processing Temperature (°C.) | Minimum Denier (d.p.f.) | Tenacity (g./d.) | Elongation (%) | Initial Modulus (g./d.) |
|---|---|---|---|---|---|
| — | 315 | 4.17 | 8.19 | 1.97 | 518 |
| 330 | 315 | 4.92 | 9.33 | 2.36 | 494 |
| 345 | 315 | 5.80 | 10.0 | 2.48 | 514 |
| 360 | 315 | 4.94 | 10.2 | 2.49 | 541 |
| 375 | 315 | 4.51 | 10.0 | 2.43 | 512 |

The data demonstrate that the process of the present invention provides a general overall improvement in properties of filaments extruded from the melt of liquid crystal polymer. In every instance, the data indicate a substantial improvement in the tenacity and the elongation of the filaments produced according to the process of the present invention.

COMPARATIVE EXAMPLE

A second sample of the liquid crystal polymer described in Example 1 was extruded in the manner described therein, with the exception that the polymer was not subjected to an elevated temperature and then cooled to a lower processing temperature prior to extrusion. In other words, the polymer was extruded in the manner of a conventional, prior art extrusion process.

The liquid crystal polymer was extruded through a single-hole spinneret into a filament. The mechanical properties of the filaments for each run were measured and are listed in Table IV.

TABLE III

| Elevated Temperature (°C.) | Processing Temperature (°C.) | Minimum Denier (d.p.f.) | Tenacity (g./d.) | Elongation (%) | Initial Modulus (g./d.) |
| --- | --- | --- | --- | --- | --- |
| — | 315 | 4.53 | 8.89 | 2.22 | 524 |
| — | 330 | 4.92 | 8.21 | 2.13 | 495 |
| — | 345 | 64.2 | 2.93 | 1.11 | 299 |

The data of Table IV illustrate the reduced properties which are obtained at the higher processing temperatures commonly encountered in the prior art.

The process of the present invention provides improved processability at such relatively low temperatures due to a significant reduction in melt viscosity. This reduction in melt viscosity is achieved by subjecting liquid crystal polymer to an elevated temperature. The melt viscosity exhibited at the elevated temperature is "remembered" by the polymer upon cooling the polymer to a lower processing temperature. The advantages of processing at relatively high temperatures can thus be had at relatively low processing temperatures without the disadvantages due to degradation of the polymer at the high temperatures.

Although the data of Tables III and IV can not be compared directly due to the fact that the data were generated from filaments produced in different runs, a qualitative comparison of the data of Tables III and IV demonstrates the improvement in properties provided by the process of the present invention. For example, filaments produced from liquid crystal polymer which was subjected to an elevated temperature of 345° C. and processed at 315° C. (Table III) exhibited properties significantly higher than those of filaments produced from liquid crystal polymer which was processed at 345° C. (Table IV).

Although the invention has been described with preferred embodiments, it is to be understood that variations and modifications may be employed as will be apparent to those skilled in the art. Such variations and modifications are to be considered within the purview and scope of the claims appended hereto.

We claim:

1. A process for the extrusion of melt processable liquid crystal polymer which provides improved processability characteristics, said process comprising the steps of:
   (a) subjecting said liquid crystal polymer to an elevated temperature between the differential scanning calorimetry transition temperature and the degradation temperature of the polymer;
   (b) cooling said liquid crystal polymer to a processing temperature which is between said differential scanning calorimetry transition temperature and said elevated temperature and at which said liquid crystal polymer is less subject to degradation than at said elevated temperature; and
   (c) extruding said liquid crystal polymer into the form of a shaped article having mechanical properties which are improved over those of articles formed from liquid crystal polymer which has not been subjected to said elevated temperature.

2. The process of claim 1 wherein said elevated temperature is within the range of approximately 40° C. to 100° C. above the differential scanning calorimetry transition temperature of said liquid crystal polymer.

3. The process of claim 1 wherein said liquid crystal polymer is subjected to said elevated temperature for a period of time not greater than approximately five minutes.

4. The process of claim 1 wherein said elevated temperature and said period of time are sufficient to effect a reduction by at least a factor of 5 in the melt viscosity of said liquid crystal polymer, as compared to the melt viscosity at said differential scanning calorimetry transition temperature.

5. The process of claim 1 wherein said liquid crystal polymer comprises wholly aromatic polyester which is capable of forming an anisotropic melt phase.

6. The process of claim 5 wherein said wholly aromatic polyester exhibits a differential scanning calorimetry transition temperature of at least approximately 275° C.

7. The process of claim 1 wherein said liquid crystal polymer is extruded through a die to form a film.

8. The process of claim 1 wherein said liquid crystal polymer is extruded through a spinneret to form filaments.

9. The process of claim 1 wherein said liquid crystal polymer is extrusion molded to form a molded article.

10. A process for the extrusion of melt processable liquid crystal polymer which provides improved processability characteristics and which yields shaped articles having improved properties, said process comprising the steps of:
    (a) subjecting said liquid crystal polymer to an elevated temperature between the differential scanning calorimetry transition temperature and the degradation temperature of the polymer for a period of time, wherein said elevated temperature and said period of time are sufficient to effect a reduction by at least a factor of 5 in the melt viscosity of said liquid crystal polymer, as compared to the melt viscosity at said differential scanning calorimetry transition temperature, without significant degradation of said liquid crystal polymer;
    (b) cooling said liquid crystal polymer to a processing temperature which is between said differential scanning calorimetry transition temperature and said elevated temperature and at which said liquid crystal polymer substantially retains the melt viscosity exhibited by said liquid crystal polymer at said elevated temperature and at which said liquid crystal polymer is less subject to degradation, the melt viscosity of said liquid crystal polymer at said processing temperature after exposure to said elevated temperature being substantially less than the melt viscosity of said liquid crystal polymer at said processing temperature without having been exposed to said elevated temperature; and
    (c) extruding said liquid crystal polymer into the form of a shaped article while the melt of said liquid crystal polymer substantially retains the melt viscosity exhibited by said liquid crystal polymer at said elevated temperature.

11. The process of claim 10 wherein said elevated temperature is within the range of approximately 40° C. to 100° C. above the differential scanning calorimetry transition temperature of said liquid crystal polymer.

12. The process of claim 10 wherein said liquid crystal polymer is subjected to said elevated temperature for a period of time not greater than approximately five minutes.

13. The process of claim 10 wherein said elevated temperature and said period of time are sufficient to effect a reduction by at least a factor of 10 in the melt viscosity of said liquid crystal polymer, as compared to the melt viscosity at said differential scanning calorimetry transition temperature.

14. The process of claim 13 wherein said elevated temperature and said period of time are sufficient to effect a reduction by at least a factor of 100 in the melt viscosity of said liquid crystal polymer, as compared to the melt viscosity at said differential scanning calorimetry transition temperature.

15. The process of claim 14 wherein said elevated temperature and said period of time are sufficient to effect a reduction by at least a factor of 1,000 in the melt viscosity of said liquid crystal polymer as compared to the melt viscosity at said differential scanning calorimetry transition temperature.

16. The process of claim 10 wherein said liquid crystal polymer comprises wholly aromatic polyester which is capable of forming an anisotropic melt phase.

17. The process of claim 16 wherein said wholly aromatic polyester exhibits a differential scanning calorimetry transition temperature of at least approximately 275° C.

18. The process of claim 10 wherein said liquid crystal polymer is extruded through a die to form a film.

19. The process of claim 10 wherein said liquid crystal polymer is extruded through a spinneret to form filaments.

20. The process of claim 10 wherein said liquid crystal polymer is extrusion molded to form a molded article.

21. A process for the extrusion of melt processable liquid crystal polymer which provides improved processability characteristics and which yields shaped articles having improved properties, said process comprising the steps of:
(a) subjecting said liquid crystal polymer for a period of time not greater than approximately five minutes to an elevated temperature within the range of approximately 40° C. to 100° C. above the differential scanning calorimetry transition temperature of said liquid crystal polymer, thereby effecting a reduction by at least a factor of 5 in the melt viscosity of said liquid crystal polymer, as compared to the melt viscosity at said differential scanning calorimetry transition temperature, without significant degradation of said liquid crystal polymer;
(b) cooling said liquid crystal polymer to a processing temperature within the range of approximately 5° C. to 40° C. above the differential scanning calorimetry transition temperature of said liquid crystal polymer, wherein said processing temperature is at least approximately 15° C. less than said elevated temperature; and
(c) extruding said liquid crystal polymer into the form of a shaped article while the melt of said liquid crystal polymer substantially retains the melt viscosity exhibited by said liquid crystal polymer at said elevated temperature.

22. The process of claim 21 wherein said liquid crystal polymer is subjected to an elevated temperature of approximately 60° C. to 85° C. above the differential scanning calorimetry transition temperature of said liquid crystal polymer.

23. The process of claim 22 wherein said liquid crystal polymer is subjected to an elevated temperature of approximately 85° C. above the differential scanning calorimetry transition temperature of said liquid crystal polymer.

24. The process of claim 21 wherein said liquid crystal polymer is subjected to said elevated temperature for a period of time of approximately 0.5 to 60 seconds.

25. The process of claim 24 wherein said liquid crystal polymer is subjected to said elevated temperature for approximately 30 seconds.

26. The process of claim 21 wherein said reduction in the melt viscosity of said liquid crystal polymer is a reduction by at least a factor of 10 as compared to the melt viscosity at said differential scanning calorimetry transition temperature.

27. The process of claim 26 wherein said reduction in the melt viscosity of said liquid crystal polymer is a reduction by at least a factor of 100 as compared to the melt viscosity at said differential scanning calorimetry transition temperature.

28. The process of claim 27 wherein said reduction in the melt viscosity of said liquid crystal polymer is a reduction by at least a factor of 1,000 as compared to the melt viscosity at said differential scanning calorimetry transition temperature.

29. The process of claim 21 wherein said liquid crystal polymer comprises wholly aromatic polyester which is capable of forming an anisotropic melt phase.

30. The process of claim 29 wherein said wholly aromatic polyester exhibits a differential scanning calorimetry transition temperature of at least approximately 275° C.

31. The process of claim 30 wherein said wholly aromatic polyester exhibits a differential scanning calorimetry transition temperature within the range of approximately 300° C. to 350° C.

32. The process of claim 29 wherein said wholly aromatic polyester comprises a melt processable wholly aromatic polyester capable of forming an anisotropic melt phase at a temperature below approximately 350° C. consisting essentially of the recurring moieties I and II wherein:

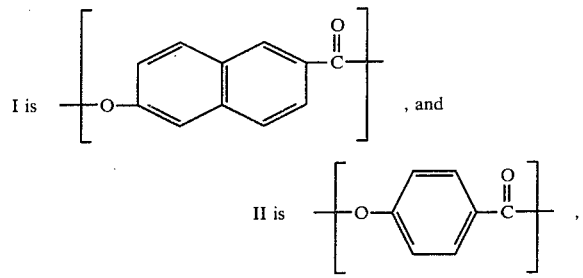

wherein said polyester comprises approximately 10 to 90 mole percent of moiety I, and approximately 10 to 90 mole percent of moiety II.

33. The process of claim 29 wherein said wholly aromatic polyester comprises a melt processable wholly aromatic polyester capable of forming an anisotropic melt phase at a temperature below approximately 325° C. consisting essentially of the recurring moieties I, II, and III wherein:

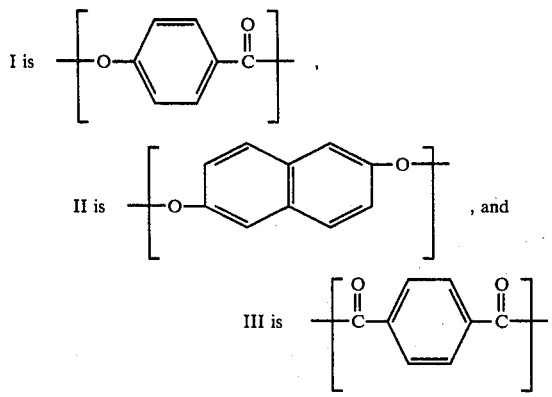

wherein said polyester comprises approximately 30 to 70 mole percent of moiety I.

34. The process of claim 21 wherein said liquid crystal polymer is extruded through a die to form a film.

35. The process of claim 21 wherein said liquid crystal polymer is extruded through a spinneret to form filaments.

36. The process of claim 21 wherein said liquid crystal polymer is extrusion molded to form a molded article.

37. A process for the extrusion of melt processable wholly aromatic polyester capable of forming an anisotropic melt phase which provides improved processability characteristics and which yields shaped articles having improved properties, wherein said wholly aromatic polyester exhibits a differential scanning calorimetry transition temperature of at least approximately 275° C., said process comprising the steps of:
(a) subjecting said wholly aromatic polyester for a period of time of approximately 0.5 to 60 seconds to an elevated temperature within the range of approximately 60° C. to 85° C. above the differential scanning calorimetry transition temperature of said wholly aromatic polyester, thereby effecting a reduction by at least a factor of 10 in the melt viscosity of said wholly aromatic polyester, as compared to the melt viscosity at said differential scanning calorimetry transition temperature, without significant degradation of said wholly aromatic polyester;
(b) cooling said wholy aromatic polyester to a processing temperature within the range of approximately 5° C. to 40° C. above the differential scanning calorimetry transition temperature of said wholly aromatic polyester; and
(c) extruding said wholly aromatic polyester into the form of a shaped article while the melt of said wholly aromatic polyester substantially retains the melt viscosity exhibited by said wholly aromatic polyester at said elevated temperature.

38. The process of claim 37 wherein said wholly aromatic polyester is subjected to an elevated temperature of approximately 85° C. above the differential scanning calorimetry transition temperature of said wholly aromatic polyester.

39. The process of claim 37 wherein said wholly aromatic polyester is subjected to said elevated temperature for approximately 30 seconds.

40. The process of claim 37 wherein said reduction in the melt viscosity of said liquid crystal polymer is a reduction by at least a factor of 100 as compared to the melt viscosity at said differential scanning calorimetry transition temperature.

41. The process of claim 40 wherein said reduction in the melt viscosity of said liquid crystal polymer is a reduction by at least a factor of 1,000 as compared to the melt viscosity at said differential scanning calorimetry transition temperature.

42. The process of claim 37 wherein said wholly aromatic polyester exhibits a differential scanning calorimetry transition temperature within the range of approximately 300° C. to 350° C.

43. The process of claim 37 wherein said wholly aromatic polyester comprises a melt processable wholly aromatic polyester capable of forming an anisotropic melt phase at a temperature below approximately 350° C. consisting essentially of the recurring moieties I and II wherein:

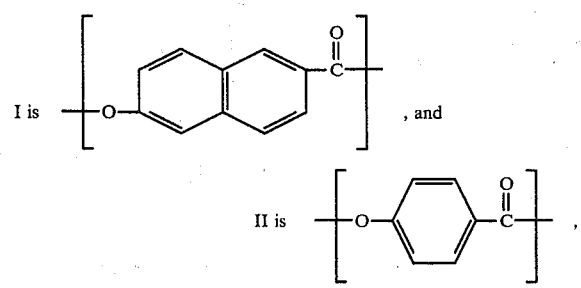

wherein said polyester comprises approximately 10 to 90 mole percent of moiety I, and approximately 10 to 90 mole percent of moiety II.

44. The process of claim 37 wherein said wholly aromatic polyester comprises a melt processable wholly aromatic polyester capable of forming an anisotropic melt phase at a temperature below approximately 325° C. consisting essentially of the recurring moieties I, II and III wherein:

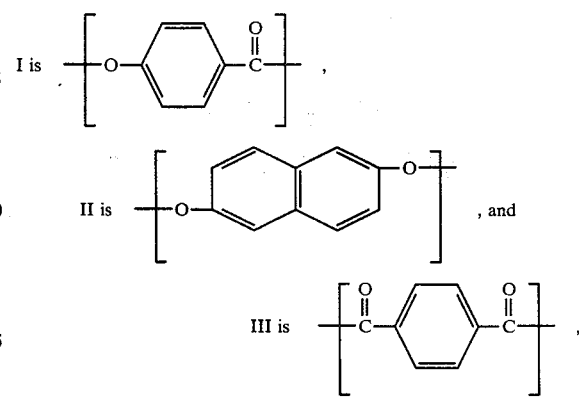

wherein said polyester comprises approximately 30 to 70 mole percent of moiety I.

45. The process of claim 37 wherein said liquid crystal polymer is extruded through a die to form a film.

46. The process of claim 37 wherein said liquid crystal polymer is extruded through a spinneret to form filaments.

47. The process of claim 37 wherein said liquid crystal polymer is extrusion molded to form a molded article.

48. A process for the extrusion of melt processable wholly aromatic polyester capable of forming an anisotropic melt phase which provides improved processability characteristics and which yields shaped articles having improved properties, wherein said wholly aromatic polyester exhibits a differential scanning calorimetry transition temperature of at least approximately 275° C. and is selected from the group consisting of:

(i) a melt processable wholly aromatic polyester capable of forming an anisotropic melt phase at a temperature below approximately 350° C. consisting essentially of the recurring moieties I and II wherein:

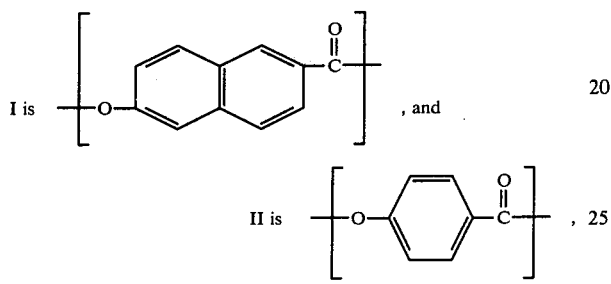

wherein said polyester comprises approximately 10 to 90 mole percent of moiety I, and approximately 10 to 90 mole percent of moiety II, and (ii) a melt processable wholly aromatic polyester capable of forming an anisotropic melt phase at a temperature below approximately 325° C. consisting essentially of the recurring moieties I, II, and III wherein:

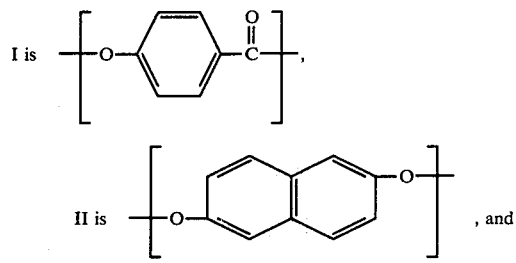

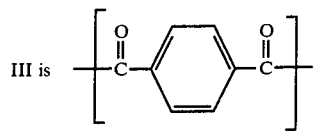

wherein said polyester comprises approximately 30 to 70 mole percent of moiety I, said process comprising the steps of:
(a) subjecting said wholly aromatic polyester for a period of time of approximately 0.5 to 60 seconds to an elevated temperature of approximately 85° C. above the differential scanning calorimetry transition temperature of said wholly aromatic polyester, thereby effecting a reduction by at least a factor of 10 in the melt viscosity of said wholly aromatic polyester, as compared to the melt viscosity at said differential scanning calorimetry transition temperature, without significant degradation of said wholly aromatic polyester;
(b) cooling said wholly aromatic polyester to a temperature within the range of approximately 5° C. to 40° C. above the differential scanning calorimetry transition temperature of said wholly aromatic polyester; and
(c) extruding said wholly aromatic polyester into the form of a shaped article while the melt of said wholly aromatic polyester substantially retains the melt viscosity exhibited by said wholly aromatic polyester at said elevated temperature.

49. The process of claim 48 wherein said wholly aromatic polyester is subjected to said elevated temperature for approximately 30 seconds.

50. The process of claim 48 wherein said wholly aromatic polyester exhibits a differential scanning calorimetry transition temperature within the range of approximately 300° C. to 350° C.

51. The process of claim 48 wherein said wholly aromatic polyester is extruded through a die to form a film.

52. The process of claim 48 wherein said wholly aromatic polymer is extruded through a spinneret to form filaments.

53. The process of claim 48 wherein said wholly aromatic polyester is extrusion molded to form a molded article.